US010174668B2

(12) United States Patent
Engelfried et al.

(10) Patent No.: US 10,174,668 B2
(45) Date of Patent: Jan. 8, 2019

(54) METHOD AND UNIT FOR OPERATING A FUEL METERING SYSTEM IN AN INTERNAL COMBUSTION ENGINE

(71) Applicant: Robert Bosch GmbH, Stuttgart (DE)

(72) Inventors: Lars Engelfried, Stuttgart (DE); Michael Bachner, Stuttgart (DE); Rolf-Dieter Koch, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/532,316

(22) PCT Filed: Oct. 29, 2015

(86) PCT No.: PCT/EP2015/075064
§ 371 (c)(1),
(2) Date: Jun. 1, 2017

(87) PCT Pub. No.: WO2016/087133
PCT Pub. Date: Jun. 9, 2016

(65) Prior Publication Data
US 2017/0268412 A1  Sep. 21, 2017

(30) Foreign Application Priority Data
Dec. 2, 2014  (DE) .................. 10 2014 224 578

(51) Int. Cl.
F02B 19/10  (2006.01)
F02D 41/10  (2006.01)
(Continued)

(52) U.S. Cl.
CPC ........ F02B 19/1085 (2013.01); F02D 33/006 (2013.01); F02D 41/005 (2013.01);
(Continued)

(58) Field of Classification Search
CPC .... F02D 33/006; F02D 41/005; F02D 41/061; F02B 19/10; F02B 19/1085
(Continued)

(56) References Cited

U.S. PATENT DOCUMENTS 4,562,814 A * 1/1986 Abo .................. F02D 41/18
                                                123/486
4,653,449 A * 3/1987 Kamei ................ F02D 41/1401
                                                123/478

(Continued)

FOREIGN PATENT DOCUMENTS

DE        19549649 B4   6/2004
DE    102011004190 A1   8/2012
(Continued)

OTHER PUBLICATIONS

International Search Report for PCT/EP2015/075064, dated Jan. 29, 2016.

Primary Examiner — Hung Q Nguyen
Assistant Examiner — Johnny H Hoang
(74) Attorney, Agent, or Firm — Norton Rose Fulbright US LLP; Gerard Messina

(57) ABSTRACT

A method and a unit for operating or for the operation of a fuel metering system of an internal combustion engine, in particular in a motor vehicle, and it being provided, in particular, that at least one operating variable of the internal combustion engine is detected, a dynamic operating state of the internal combustion engine is detected based on the at least one detected operating variable, and a dynamic correction to the fuel metering system of the internal combustion engine is carried out for a detected dynamic operating state of the internal combustion engine, taking into account the efficiency of an NOx exhaust gas aftertreatment system.

14 Claims, 2 Drawing Sheets

(51) Int. Cl.
    *F02D 41/40*    (2006.01)
    *F02D 33/00*    (2006.01)
    *F02D 41/00*    (2006.01)
    *F02D 41/06*    (2006.01)
    *F02D 28/00*    (2006.01)
(52) U.S. Cl.
    CPC ......... *F02D 41/061* (2013.01); *F02D 41/107* (2013.01); *F02D 41/401* (2013.01); *F02D 41/402* (2013.01); *F01N 2900/1621* (2013.01); *F02B 19/10* (2013.01); *F02D 28/00* (2013.01); *F02D 2200/0806* (2013.01); *F02D 2200/0811* (2013.01); *Y02T 10/125* (2013.01); *Y02T 10/44* (2013.01)
(58) Field of Classification Search
    USPC .......... 123/478–481; 701/102–105, 114, 115
    See application file for complete search history.

(56) References Cited

U.S. PATENT DOCUMENTS

| | | | |
|---|---|---|---|
| 5,572,981 A * | 11/1996 | Pfleger | F02M 25/0809 123/520 |
| 7,475,671 B1 | 1/2009 | Fattic et al. | |
| 9,022,011 B2 * | 5/2015 | Andersson | F02D 31/006 123/676 |
| 2003/0029222 A1 * | 2/2003 | Landschoff | F02D 41/222 73/1.58 |
| 2009/0164088 A1 * | 6/2009 | Haft | F01N 11/005 701/102 |
| 2010/0138107 A1 * | 6/2010 | Morris | B60K 6/445 701/36 |
| 2011/0000465 A1 * | 1/2011 | Stoecklein | F02D 41/2096 123/478 |
| 2014/0165538 A1 | 6/2014 | Kim | |
| 2015/0114326 A1 * | 4/2015 | Burkhardt | F02D 41/221 123/41.86 |

FOREIGN PATENT DOCUMENTS

| | | |
|---|---|---|
| EP | 1176290 A1 | 1/2002 |
| EP | 1860292 A1 | 11/2007 |
| WO | 2012047191 A1 | 4/2012 |

* cited by examiner

METHOD AND UNIT FOR OPERATING A FUEL METERING SYSTEM IN AN INTERNAL COMBUSTION ENGINE

FIELD OF THE INVENTION

The present invention relates to a method and a unit for operating a fuel metering system in an internal combustion engine, in particular in a motor vehicle. The present invention further relates to a computer program, a machine-readable data carrier for storing the computer program, and an electronic control unit, with the aid of which the method according to the present invention may be carried out.

BACKGROUND INFORMATION

In the field of compression-ignition internal combustion engines (diesel engines), in particular, the continuous tightening of limit values for pollutant emissions therefore results in stricter requirements with respect to particulate and nitrogen oxide (NOx) emissions.

The formation of nitrogen oxides may be reduced in this case with the aid of so-called exhaust gas recirculation (EGR) and by changing the point in time of a fuel metering into a combustion chamber of the internal combustion engine, e.g. by delaying the beginning of a fuel metering or a corresponding fuel injection. In the case of a so-called common rail system (CRS) including a high pressure accumulator for fuel, the nitrogen oxide formation may also be reduced by lowering the rail pressure.

The active principle underlying the aforementioned measures is based, in particular, on lowering the combustion temperature in the aforementioned combustion chamber. The aforementioned measures may also result in disadvantages due to the influencing of the combustion process. In this way, on the one hand, an increase in fuel consumption may occur due to reduced combustion efficiency.

On the other hand, due to the resultant lower combustion efficiency, the particulate emissions may increase in the case of a compression-ignition internal combustion engine (diesel engine). As a result, in the case of such an internal combustion engine, NOx emissions, increased fuel consumption, as well as particulate emissions, present conflicting objectives.

All aforementioned measures (delayed combustion position, reduced rail pressure) tend to result in reduced noise generation, the noise generation being additionally influenceable by the timing and quantity of the pre-injections.

Due to the previous statutory requirements for the exhaust-gas test cycle in the passenger car sector, there are only low requirements on the reduction of pollutant emissions during the dynamic operation of the internal combustion engine. In order to optimize a corresponding injection system, efforts were essentially concentrated on reducing emissions in conjunction with good consumption values and acceptable noise development under stationary conditions (i.e., no load changes, only moderate acceleration, etc.). In particular, setpoint values for injection parameters are determined in this case on the basis of a stationary characteristic map and based on the speed and the load of the internal combustion engine.

Furthermore, exhaust gas aftertreatment systems for NOx reduction are known, e.g., an NOx storage catalyst (NSC), a catalyst having selective catalytic reduction (SCR), or a particulate filter including an SCR coating (SCRF), which are referred to in general as NOx exhaust gas aftertreatment systems which either temporarily store raw NOx emissions resulting from combustion and break down the emissions into non-harmful products during a so-called regeneration phase (NSC) or provide for an immediate conversion into non-harmful products by way of the addition of reducing agents (SCR). The efficiency of an NOx exhaust gas aftertreatment system which is achievable, in principle, in this case, is dependent on further limiting conditions, however, such as, e.g., the size of the catalytic converter, the material of the particular catalytic converter, the mass flow rate of the NOx, the exhaust gas temperature, the composition of the exhaust gas, the loading state of the catalytic converter (NSC), or the fill level of the reductant (SCR) and, therefore, is frequently not optimal.

In exhaust-gas investigations with respect to the aforementioned combustion-related emissions of an internal combustion engine affected here, highly dynamic test cycles or test cycles including a substantially greater dynamic portion (i.e., load jumps or rapid load increases, in particular) are now also being carried out or will also be carried out in the future due to statutory requirements for passenger car engines and commercial vehicle engines with respect to the aforementioned measurements carried out during the purely static operation of an internal combustion engine. The focus in this case, in particular, is on so-called "real driving emissions" (RDE) in Europe, Japan, and the USA. In this case, fuel consumption will also be the focus of a corresponding certification.

SUMMARY OF THE INVENTION

The dynamic correction proposed according to the present invention is based on a change in fuel metering and fuel injection parameters in particular in the case of a load jump or in the case of an acceleration of the internal combustion engine or the particular motor vehicle and, therefore, is not dependent on the exact operating point of the internal combustion engine.

The dynamic correction function detects, on the one hand, such dynamic operating states of the internal combustion engine. On the other hand, due to certain corrections carried out on the injection system, the particulate and NOx emissions as well as the response and noise behavior of the internal combustion engine are influenced in a targeted way. As a result, during a rapid change of an operating point of the internal combustion engine, emission spikes which may occur may be effectively reduced or such transients in a fuel metering system affected here may be corrected with high precision (so-called "transient correction").

The described dynamic correction also makes it possible under aforementioned dynamic operating conditions to reach a good or even optimal compromise between fuel consumption and NOx emissions and, in addition, is individually adaptable to the particular internal combustion engine and the corresponding exhaust gas aftertreatment.

A possible corrective intervention by shifting the combustion center of gravity to retard results in an increased enthalpy in the exhaust gas of the internal combustion engine, which provides additional energy to a turbine of a supercharger, which is provided in the case of exhaust-gas recirculation, for accelerating the charging speed and may therefore improve the build-up of charge air pressure.

In addition, depending on the selected exhaust gas aftertreatment strategy, calibration or pre-setting of the dynamic function, the emission centroid may be shifted in favor of NOx reduction or in favor of reduction or minimization of fuel consumption, without changing the application or the settings for the stationary operation.

Due to an aforementioned shift of the emission centroid, an aforementioned exhaust gas aftertreatment may be carried out even more efficiently and therefore results in a reduction in pollutant emissions. In this way, e.g., the NOx conversion rate of an SCR catalyst is substantially higher in a constant NOx stream without emission spikes than in a highly dynamically changing NOx stream. Due to the dynamic function provided according to the present invention, a more uniform progression is therefore implemented without simultaneously overloading the particulate filter due to excessive soot emissions. Due to a targeted activation of corrections carried out on the injection system, the aforementioned disadvantage of fuel consumption may also be minimized or increases in fuel consumption may be held low.

One further advantage of the method according to the present invention results when, in addition, the stationary basic application of a fuel metering affected here may be configured to be more optimal with respect to fuel consumption. In the previous application approach, an application which is optimal with respect to fuel consumption results in high NOx spikes in dynamic transitions, and therefore a compromise must always be reached between NOx spikes and low fuel consumption (so-called NOx derivative). Due to the dynamic correction according to the present invention, the stationary basic application may be consistently parameterized with respect to optimal fuel consumption (it being possible to compensate for associated slight increases in NOx emissions via an NOx exhaust gas aftertreatment system operating optimally in stationary mode) since dynamic NOx spikes may be effectively reduced by the dynamic correction. An NOx derivative becomes superfluous as a result or may be at least greatly reduced.

An aforementioned emissions assessment may take place on the basis of the total system made up of the internal combustion engine and the so-called NOx exhaust gas aftertreatment system. Therefore, the injection parameters may be activated in a targeted manner and, therefore, optimally, when the efficiency of the NOx exhaust gas aftertreatment system is utilized as additional information. Since the compliance with emission limit values is to take place in the future not only in predefined test cycles but also in incidental test cycles and with mobile measuring devices during the operation of the internal combustion engine or during the operation of the underlying motor vehicle, it is advantageous to also account for the NOx emissions which occurred in the past or in previous time periods. In this way, e.g., given a sufficiently high efficiency of the NOx exhaust gas aftertreatment system and a previously low level of NOx emissions, transient interventions into the injection system may become fewer or even be completely dispensed with in order to achieve a low fuel consumption, whereas, given a low efficiency of the NOx exhaust gas aftertreatment system and/or an NOx emissions level which was previously already high, the aforementioned interventions are needed even more in order to not exceed a predefined critical pollutant-emissions level of the exhaust gas.

In conjunction with the method according to the present invention, it is further emphasized that, in the case of a compression-ignition internal combustion engine (diesel engine), load jumps or rapid load increases of the type which occur frequently in future test cycles result in a build-up of the charge air pressure which is delayed as compared to the torque build-up, due to the inertia of the air system. The cause of this inertia is, inter alia, the moment of inertia of a turbocharger and the dead volume occurring between a compressor and an intake valve of the internal combustion engine. In addition, the injection system, which implements the load request from the driver, has a substantially shorter reaction time than the air system of the compression-ignition internal combustion engine.

It is further emphasized that the cylinder charge of a compression-ignition internal combustion engine is determined substantially by the charge air pressure which is sluggish per se. Setpoint values of the injection system based on a certain injection quantity and speed are therefore not suitable for the dynamic state of the internal combustion engine.

In the field of compression-ignition internal combustion engines, a regulation of the fresh air mass or the EGR rate is utilized, as known, in the case of an aforementioned exhaust gas recirculation (EGR). In the case of a reduced cylinder charge due to a sluggish build-up of charge air pressure, the stationary setpoint value of an air flow control effectuates a great reduction in the EGR rate and, therefore, results in dynamic NOx spikes. In the case of an EGR rate control, the result is a smaller air mass and, therefore, increased particulate emissions and a further reduction in the charge air pressure dynamics. Dynamic adaptations of the injection system parameters based on deviations of the air mass, which may not be adjusted if the charge air pressure is too low and, in particular, close to the smoke limit, are known. Since the air mass deviation is taken into account, in principle, only in the case of an air flow control, and, in addition, the air mass deviation only insufficiently characterizes critical emission peaks, this method is unsuitable for effectively reducing the NOx peaks without significantly increasing the fuel consumption.

The aforementioned detection of dynamic operating states of the internal combustion engine may advantageously take place on the basis of a control deviation of the aforementioned charge air pressure, since the aforementioned delayed build-up of charge air pressure is the basic cause of the slow air system behavior. A dynamic indicator provided according to the present invention may be standardized or limited to values 0 and 1, the value 0 corresponding to a stationary operation of the internal combustion engine and the value 1 corresponding to a dynamic operation of the internal combustion engine. As a result, the implementation effort and the computing capacity required for the method are substantially reduced.

In the case of a dynamic operating state which has been detected in this way, any emission spikes or peaks occurring in the transient operation may be substantially reduced by way of a suitable dynamic adaptation of injection parameters, e.g., the beginning of injection, the rail pressure, and the temporal or crank angle-based position and quantity of partial injections such as pre-injections and/or post-injections.

The effectiveness of the method according to the present invention, in particular the detection of the need for dynamic corrections, may be essentially increased by determining the efficiency of an aforementioned exhaust gas aftertreatment system, and an aforementioned dynamic corrective intervention on the fuel metering system of the internal combustion engine is carried out only when the efficiency of the exhaust gas aftertreatment system falls below a predefined threshold value.

The efficiency of the exhaust gas aftertreatment system may be taken into account in a technically simple and, therefore, cost-effective way with the aid of a transfer characteristic map and an NOx exhaust gas aftertreatment factor derived from the transfer characteristic map. The transfer characteristic map will be or may be formed by NOx emission levels plotted in one direction and by average NOx emission values plotted in the other direction, a high value of the NOx emissions and a simultaneously high average emission value resulting in a value of the NOx exhaust gas aftertreatment factor of 1.

The need for dynamic corrections may be assessed in an even better way by accounting for average NOx emissions, which have been additionally summed in a preceding time period, i.e., the previous history of the exhaust gas aftertreatment of nitrogen oxides.

The present invention may be utilized with the advantages described herein, in particular, in a passenger car or a commercial vehicle including a fuel metering system which is affected here, the underlying dynamic function being able to be implemented or integrated into an existing control program or an existing control unit of an internal combustion engine which is affected here. The application is possible in all fuel metering or fuel injection systems known today. Further functional adaptations are required, however, in systems having a cylinder pressure control (CSCP), during the implementation. The dynamic function makes it possible, in particular, to substantially reduce aforementioned RDE emissions and to substantially increase or improve the efficiency of an NOx exhaust gas aftertreatment system.

The computer program according to the present invention is configured for carrying out every step of the method, in particular when the computer program runs on a computer or a control unit. The computer program makes it possible to implement the method according to the present invention on an electronic control unit without the need to make structural changes thereto. The machine-readable data carrier, on which the computer program according to the present invention is stored, is provided for this purpose. By loading the computer program according to the present invention on an electronic control unit, the electronic control unit according to the present invention is obtained; the electronic control unit is configured for controlling a fuel metering system, which is affected here, with the aid of the method according to the present invention.

Further advantages and embodiments of the present invention result from the description and the attached drawings.

It is understood that the features, which are mentioned above and which will be described in greater detail in the following, are usable not only in the particular combination indicated, but also in other combinations or alone, without departing from the scope of the present invention.

DETAILED DESCRIPTION

In the present exemplary embodiment, the detection of a dynamic operating state of the internal combustion engine takes place in the case of an internal combustion engine including a turbocharger by monitoring a relative control deviation of a charge air pressure or a manifold air pressure.

In cases in which the charge air pressure is adjusted purely in a precontrolled way, or in which there is no active charge air pressure control available, a comparison may be alternatively carried out between a present charge air pressure and a reference charge air pressure which is predefined or which was empirically determined, for example, in advance. In this case, environmental conditions such as, e.g., the ambient temperature or the ambient air pressure, may also be taken into account. In the latter-mentioned cases, in turn, as an alternative, the charge air pressure itself and/or the engine load may also be monitored and utilized for the dynamic detection.

Figure 1:
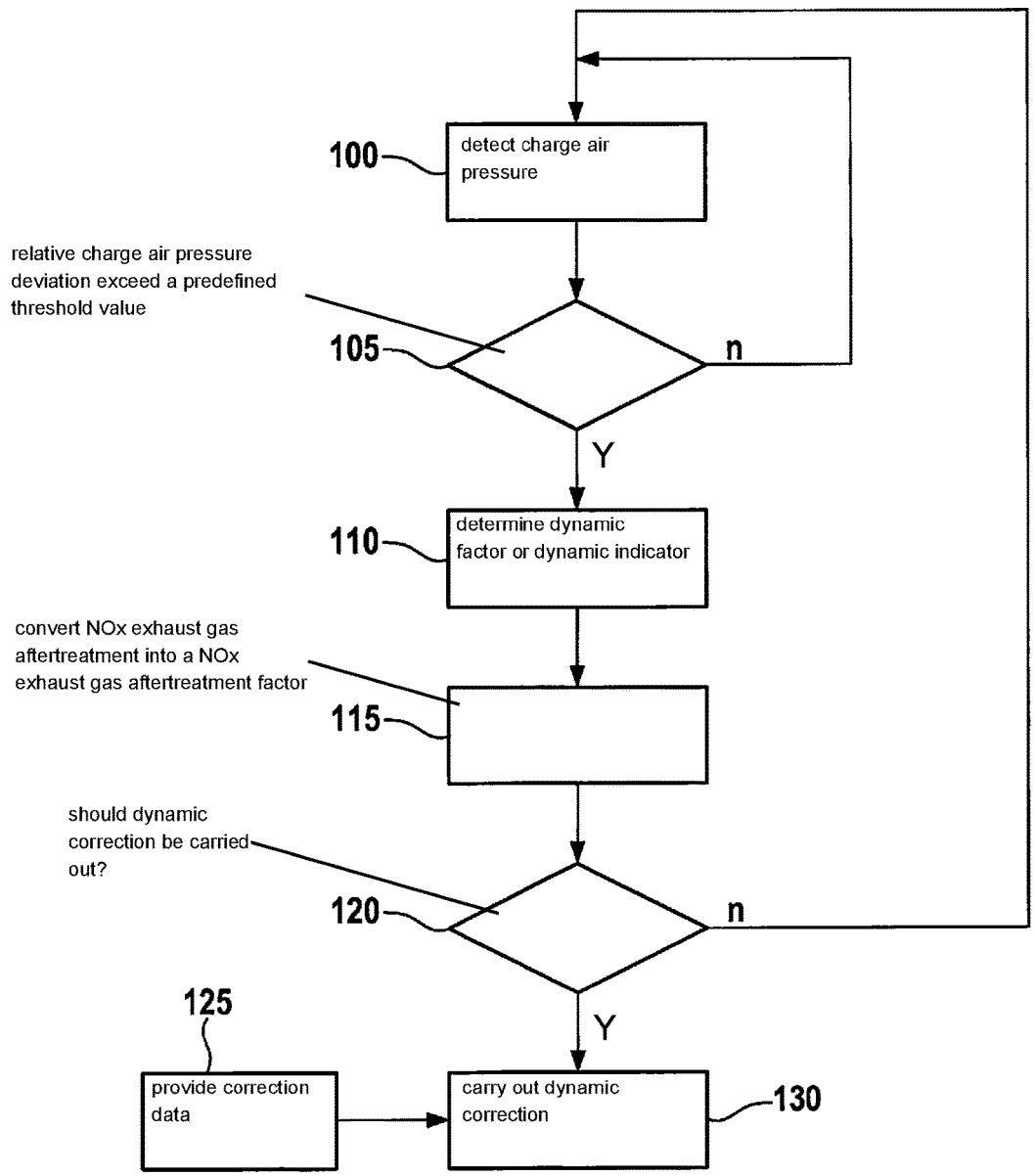
FIG. 1 shows one exemplary embodiment of the method according to the present invention on the basis of a flow chart.

As illustrated in the flow chart shown in FIG. 1, in order to detect an aforementioned dynamic operating state on the basis of a charge air pressure detected 100 in a way known per se, a check is carried out 105 to determine whether an aforementioned relative charge air pressure deviation exceeding a predefined threshold value is present. If a corresponding charge air pressure deviation is not present, the method returns to the beginning of the procedure. Otherwise, a dynamic factor, which is described in detail in the following, or a dynamic indicator (standardized to continuous values between 0 (=stationary) and 1 (=dynamic)) is determined 110. In this case, the value 0 means there is no or only a slight charge air pressure deviation, i.e., essentially a stationary operation of the internal combustion engine, and the value 1 means there is a relatively great charge air pressure deviation, i.e., essentially a dynamic operation of the internal combustion engine in the aforementioned sense.

The dynamic correction of the injection parameters is activated or deactivated on the basis of the particular value of the dynamic indicator which is present. In addition, on the basis of a transfer characteristic map shown in FIG. 2, the present efficiency of the NOx exhaust gas aftertreatment is converted 115 into a so-called NOx exhaust gas aftertreatment factor (standardized to continuous values between 0=sufficient efficiency of NOx exhaust gas aftertreatment, and 1=support required by engine-related measures). In this case, the value is 0 when the efficiency of the particular NOx exhaust gas aftertreatment system is sufficient for an effective exhaust gas aftertreatment or, in the present case, in particular, for an effective NOx reduction, and the value is 1 when support for such an effective exhaust gas aftertreatment is required by measures applied to the operation of the internal combustion engine.

As shown in FIG. 1, a check 120 is therefore carried out on the basis of the result of the multiplication of the dynamic factor 110 and the NOx exhaust gas aftertreatment factor 115 to determine whether a dynamic correction, which was mentioned above and which will be described herein in detail in the following, should be carried out or not. If not, the method returns to the beginning of the procedure. Otherwise, in the present exemplary embodiment, a dynamic correction, which is described in the following, is carried out 130 on the basis of correction data provided 125 by an offset characteristic map.

An aforementioned dynamic correction takes place by changing injection parameters, e.g., the beginning of injection, the rail pressure, and the timed position or phase angle with respect to the crankshaft angle and the injection quantity of pre- and post-injections. In the exemplary embodiment, corresponding dynamic correction values are determined on the basis of an offset characteristic map or are taken from such a characteristic map, and these correction values are multiplied by the standardized dynamic indicator, and the resultant standardized correction value is added to a particular stationary setpoint value (see also FIG. 2). By accurately activating the aforementioned interventions or corrections on an injection system, NOx emissions may be reduced and, simultaneously, the negative influences of the correction on fuel consumption may be minimized.

Figure 2:
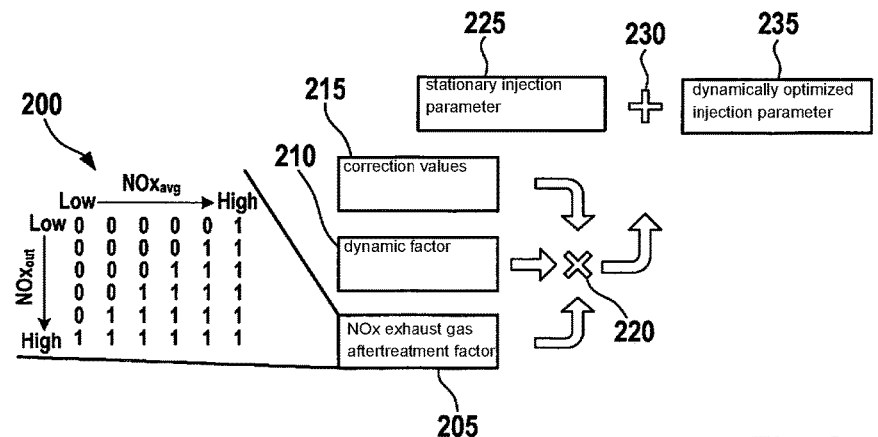
FIG. 2 shows a combined flow chart/block diagram for illustrating the method according to the present invention, and a unit according to the present invention.

FIG. 2 shows one exemplary embodiment of the method according to the present invention or a unit according to the present invention for dynamic injection correction on the basis of a combined flow chart/block diagram. The efficiency of the NOx reduction, in particular, which is achievable or which has already been achieved by the exhaust gas aftertreatment with the aid of an NOx exhaust gas aftertreatment system, is taken into account in this unit. The input variables for the calculation shown are standardized values 0 to 1 which are provided by an aforementioned transfer characteristic map 200 and which are taken into account 205 as an NOx exhaust gas aftertreatment factor. In the present exemplary embodiment, these values of the NOx exhaust gas aftertreatment factor are entered or plotted in the transfer characteristic map 200, with the level of the NOx emission $NOx_{out}$ plotted in the vertical direction over average NOx emission values $NOx_{avg}$ in the horizontal direction. A high value of the NOx emission corresponds to an aforementioned emission spike (peak) and corresponds to a value 1 when an average value $NOx_{avg}$ is simultaneously high.

Figure 3:
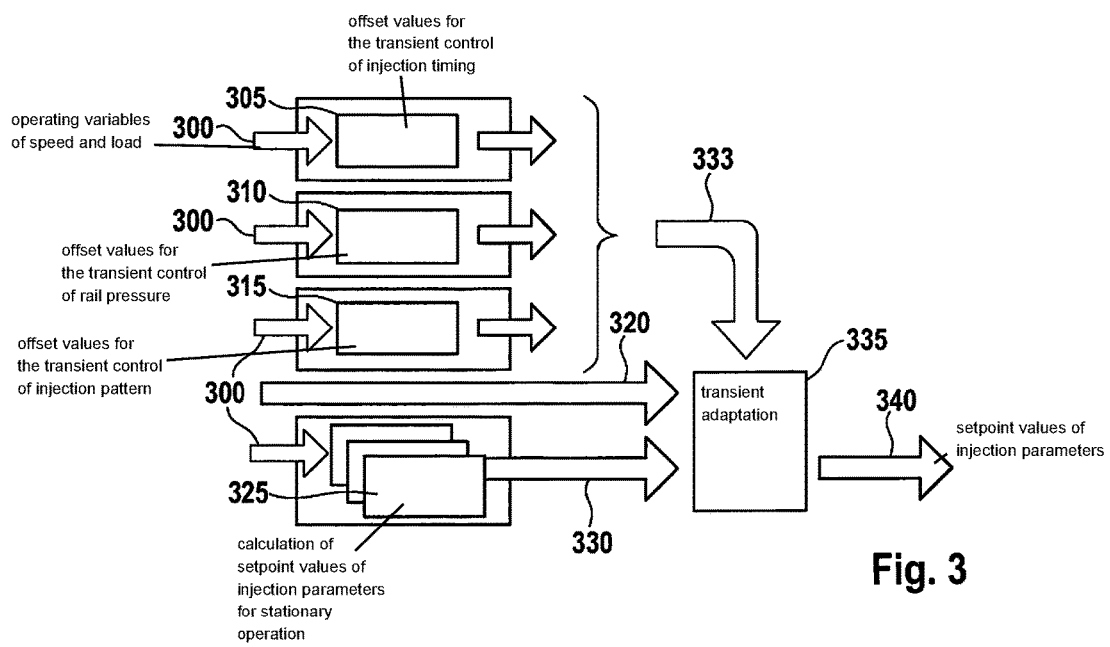
FIG. 3 shows exemplary embodiments of a dynamic injection correction according to the present invention.

In order to account for the efficiency of an NOx exhaust gas aftertreatment, a dynamic factor 210 is additionally determined and correction values are provided by or read from a dynamic offset characteristic map 215 (see also FIG. 3 and associated description). The values resulting according to 210 and 215 are subsequently multiplied 220 by the aforementioned dynamic correction value 205.

The aforementioned dynamic factor 210 has the value 0 when only a very slight charge air pressure deviation, i.e., a stationary operation of the internal combustion engine, is present, and has the value 1 when a relatively great charge air pressure deviation, i.e., a dynamic operation of the internal combustion engine in the aforementioned sense, is present.

The aforementioned NOx exhaust gas aftertreatment factor 205 is ascertained from a transfer characteristic map which, in the present exemplary embodiment, covers the mass flow rate of NOx after NOx exhaust gas aftertreatment ($NOx_{out}$) or, if available, covers the efficiency of the NOx exhaust gas aftertreatment, and the average NOx emissions $NOx_{avg}$ summed in a preceding time period. The aforementioned preceding time period may be 10 min to 30 min before the particular actual time. It should be noted that the NOx exhaust gas aftertreatment factor according to one simplified variant may also be ascertained with the aid of a characteristic curve via the NOx exhaust gas temperature which determines the efficiency of the exhaust gas aftertreatment.

In the exemplary embodiment shown in FIG. 2, it is assumed that an aforementioned dynamic correction is carried out. For this purpose, the value resulting from the multiplication 220 is added 230 to a stationary injection parameter 225. The result of the addition 230, therefore, is a dynamically optimized injection parameter 235.

The aforementioned transient corrective interventions into the injection system may be fully activated in the event of a high mass flow rate of NOx after NOx exhaust gas aftertreatment (or the aforementioned low efficiency of NOx exhaust gas aftertreatment) and high NOx emissions already in the aforementioned preceding time period or, if these conditions are not present, the corrective interventions may be attenuated or completely deactivated.

FIG. 3 shows one first exemplary embodiment of a transient control affected here, in which an aforementioned offset characteristic map covers the operating variables of speed and load 300 of the internal combustion engine, aforementioned critical emission spikes mostly occurring only at higher loads. Due to a dynamic correction which takes place only at high loads, NOx emission spikes may be reduced without the fuel consumption increasing too greatly.

In the present exemplary embodiment, offset values for the transient control of injection timing 305 and rail pressure 310 and the transient control of injection pattern 315 for the aforementioned pre-injections and/or post-injections are ascertained on the basis of the operating variables speed and load 300. In addition, information regarding transient operating conditions of the internal combustion engine 320 are read out, e.g., from a control unit of the internal combustion engine.

A calculation 325 of setpoint values of the injection parameters for the stationary operation, from which injection parameters which are suitable for the stationary operation are derived 330, is additionally carried out on the basis of the operating variables of speed and load 300.

The three variables 305, 310, 315 are jointly 333 processed further and, together with variables 320, 330, are supplied to a transient adaptation 335 which, in the end, delivers setpoint values of the injection parameters 340 which are desired or required for the dynamic correction.

According to one second exemplary embodiment of a transient control, which is not shown here, an aforementioned offset characteristic map does not cover the aforementioned operating variables of load and speed 300, but rather covers the two air system variables of inert gas rate and charge coefficient. In dynamic operating states, due to the absence of charge air pressure, the charge coefficient initially assumes low values which are increased as the charge air pressure increases (and, therefore, as the cylinder charge increases). If the EGR quantity is reduced due to insufficient cylinder charge, the inert gas rate decreases (no EGR means inert gas rate=0 or O2 concentration=O2 fresh air). As soon as the charge is sufficiently high enough to reactivate the EGR, the inert gas rate also increases. Since the O2 concentration and, therefore, the inert gas rate at the cylinder inlet correlate well with the NOx emissions, the aforementioned measures in the injection system may be accurately controlled or activated by accounting for the present state of the air system (inert gas rate and charge coefficient). In this case, input variables 300 represented in the upper left in FIG. 3 for the offsets of injection timing 305 and rail pressure 310 and the control of injection pattern 315 are replaced by the aforementioned inert gas rate and the aforementioned charge coefficient. The input variables for aforementioned setpoint value calculation 325 represented in the lower left in FIG. 3 remain unchanged, i.e., the load and the speed of the internal combustion engine.

In this second exemplary embodiment, an activation of aforementioned injection system interventions or corrections are made possible on the basis of air system variables which are decisive for the combustion and occur at the cylinder inlet. The aforementioned charge coefficient includes the value of a cylinder charge which has been standardized with the injection quantity and therefore allows for a parameterization which is essentially independent of the operating point of the internal combustion engine or the injection system. Due to a dynamic correction which takes place only at a low inert gas rate, in turn, NOx emission spikes may be reduced without the fuel consumption exceeding a maximally permissible limit value of increased fuel consumption of 0.5%. An aforementioned relatively low inert gas rate results in a cylinder of the internal combustion engine at a relatively low or even completely suppressed exhaust gas recirculation.

As compared to the exemplary embodiment shown in FIG. 3, the second exemplary embodiment has the further advantage that it is possible to respond immediately to the state of the gas mixture in the cylinder or in the corresponding combustion chamber, whereby an even more accurate activation of the aforementioned injection corrections is made possible and, therefore, further advantages with respect to the reduction of NOx, particulates, and fuel consumption way result.

The described method may be implemented in the form of a control program for an electronic control unit for controlling an internal combustion engine or in the form of one or several corresponding electronic control units (ECUs).

What is claimed is:

1. A method for operating a fuel metering system of an internal combustion engine, the method comprising:
    detecting at least one operating variable of the internal combustion engine;
    detecting a dynamic operating state of the internal combustion engine based on the at least one detected operating variable; and
    performing a dynamic correction of the fuel metering system of the internal combustion engine for the detected dynamic operating state of the internal combustion engine, the dynamic correction being performed by changing at least one injection parameter including at least one of: (i) a beginning of injection, (ii) a rail pressure, (iii) a time position or phase angle with respect to a crankshaft angle of injections, (iv) an injection quantity of pre-injections, or (v) an injection quantity of post-injections;
    wherein an efficiency of an exhaust gas aftertreatment system of the internal combustion engine is determined and the dynamic correction of the fuel metering system of the internal combustion engine is carried out only when a predefined threshold value of the efficiency of the exhaust gas aftertreatment system is fallen below;
    wherein the efficiency of the exhaust gas aftertreatment system is taken into account using a transfer characteristic map and an NOx exhaust gas aftertreatment factor derived from the transfer characteristic map.

2. The method of claim 1, wherein the NOx exhaust gas aftertreatment factor is formed from the transfer characteristic map including NOx emission levels plotted in one direction and average NOx emission values plotted in the other direction, a high value of the NOx emissions and a simultaneously high average emission value resulting in a value of the NOx exhaust gas aftertreatment factor of 1, wherein the NOx levels are one of: (i) mass flow rates of NOx after NOx exhaust gas aftertreatment, or (ii) efficiencies of the NOx exhaust gas aftertreatment, and wherein the average NOx emission values are averages of NOx emissions summed in a preceding time period.

3. The method of claim 1, wherein average NOx emissions summed in a preceding time period are taken into account in the transfer characteristic map.

4. The method of claim 1, wherein the dynamic operating state of the internal combustion engine is characterized with a dynamic indicator, the dynamic indicator being standardized to values 0 and 1, the value 0 corresponding to a stationary operation of the internal combustion engine, and the value 1 corresponding to a dynamic operation of the internal combustion engine.

5. The method of claim 1, wherein the detection of the dynamic operating state of the internal combustion engine takes place on the basis of a change in charge air pressure or a change in manifold air pressure.

6. The method of claim 1, wherein the dynamic correction of the fuel metering system of the internal combustion engine takes place by shifting a combustion center of gravity to retard.

7. The method of claim 1, further comprising:
    operating the fuel metering system of the internal combustion engine using the changed at least one injection parameter.

8. A unit for operating a fuel metering system of an internal combustion engine, comprising:
    a control arrangement configured to perform:
        detecting at least one operating variable of the internal combustion engine;
        detecting a dynamic operating state of the internal combustion engine based on the at least one detected operating variable; and
        performing a dynamic correction of the fuel metering system of the internal combustion engine for the detected dynamic operating state of the internal combustion engine, the dynamic correction being performed by changing at least one injection parameter including at least one of: (i) a beginning of injection, (ii) a rail pressure, (iii) a time position or phase angle with respect to a crankshaft angle of injections, (iv) an injection quantity of pre-injections, or (v) an injection quantity of post-injections;
    wherein an efficiency of an exhaust gas aftertreatment system of the internal combustion engine is determined and the dynamic correction of the fuel metering system of the internal combustion engine is carried out only when a predefined threshold value of the efficiency of the exhaust gas aftertreatment system is fallen below;
    wherein the efficiency of the exhaust gas aftertreatment system is taken into account using a transfer characteristic map and an NOx exhaust gas aftertreatment factor derived from the transfer characteristic map.

9. The unit of claim 8, wherein the control arrangement is further configured to perform:
    operating the fuel metering system of the internal combustion engine using the changed at least one injection parameter.

10. A non-transitory computer readable medium having a computer program, which is executable by a processor, comprising:
    a program code arrangement having program code for controlling a fuel metering system of an internal combustion engine, by performing:
        detecting at least one operating variable of the internal combustion engine;
        detecting a dynamic operating state of the internal combustion engine based on the at least one detected operating variable; and
        performing a dynamic correction of the fuel metering system of the internal combustion engine for the detected dynamic operating state of the internal combustion engine, the dynamic correction being performed by changing at least one injection parameter including at least one of: (i) a beginning of injection, (ii) a rail pressure, (iii) a time position or phase angle with respect to a crankshaft angle of injections, (iv) an injection quantity of pre-injections, or (v) an injection quantity of post-injections;

wherein an efficiency of an exhaust gas aftertreatment system of the internal combustion engine is determined and the dynamic correction of the fuel metering system of the internal combustion engine is carried out only when a predefined threshold value of the efficiency of the exhaust gas aftertreatment system is fallen below;

wherein the efficiency of the exhaust gas aftertreatment system is taken into account using a transfer characteristic map and an NOx exhaust gas aftertreatment factor derived from the transfer characteristic map.

11. The non-transitory computer readable medium of claim 10, wherein the program code further performs:
operating the fuel metering system of the internal combustion engine using the changed at least one injection parameter.

12. An electronic control unit for controlling a fuel metering system of an internal combustion engine, comprising:
a control arrangement configured to perform:
detecting at least one operating variable of the internal combustion engine;
detecting a dynamic operating state of the internal combustion engine based on the at least one detected operating variable; and
performing a dynamic correction of the fuel metering system of the internal combustion engine for the detected dynamic operating state of the internal combustion engine, the dynamic correction being performed by changing at least one injection parameter including at least one of: (i) a beginning of injection, (ii) a rail pressure, (iii) a time position or phase angle with respect to a crankshaft angle of injections, (iv) an injection quantity of pre-injections, or (v) an injection quantity of post-injections;
wherein an efficiency of an exhaust gas aftertreatment system of the internal combustion engine is determined and the dynamic correction of the fuel metering system of the internal combustion engine is carried out only when a predefined threshold value of the efficiency of the exhaust gas aftertreatment system is fallen below;
wherein the efficiency of the exhaust gas aftertreatment system is taken into account using a transfer characteristic map and an NOx exhaust gas aftertreatment factor derived from the transfer characteristic map.

13. The electronic control unit of claim 12, wherein the control arrangement is further configured to perform:
operating the fuel metering system of the internal combustion engine using the changed at least one injection parameter.

14. A method for operating a fuel metering system of an internal combustion engine, the method comprising:
detecting at least one operating variable of the internal combustion engine;
detecting a dynamic operating state of the internal combustion engine based on the at least one detected operating variable;
determining an NOx exhaust gas aftertreatment factor, the factor being derived from a transfer characteristic map, the transfer characteristic map including NOx emission levels plotted in one direction and average NOx emission values plotted in the other direction, a high value of the NOx emissions and a simultaneously high average emission value resulting in a value of the NOx exhaust gas aftertreatment factor of 1, wherein the NOx levels are one of: (i) mass flow rates of NOx after NOx exhaust gas aftertreatment, or (ii) efficiencies of the NOx exhaust gas aftertreatment, and wherein the average NOx emission values are averages of NOx emissions summed in a preceding time period;
performing, based on the NOx exhaust gas aftertreatment factor, a dynamic correction of the fuel metering system of the internal combustion engine for the detected dynamic operating state of the internal combustion engine, the dynamic correction being performed by changing at least one injection parameter including at least one of: (i) a beginning of injection, (ii) a rail pressure, (iii) a time position or phase angle with respect to a crankshaft angle of injections, (iv) an injection quantity of pre-injections, or (v) an injection quantity of post-injections; and
operating the fuel metering system of the internal combustion engine using the changed at least one injection parameter.

* * * * *